July 3, 1928.
W. A. GULLETTE
1,675,931
LAMP SUPPORT FOR AUTOMOBILE RUNNING BOARDS
Original Filed May 12, 1927
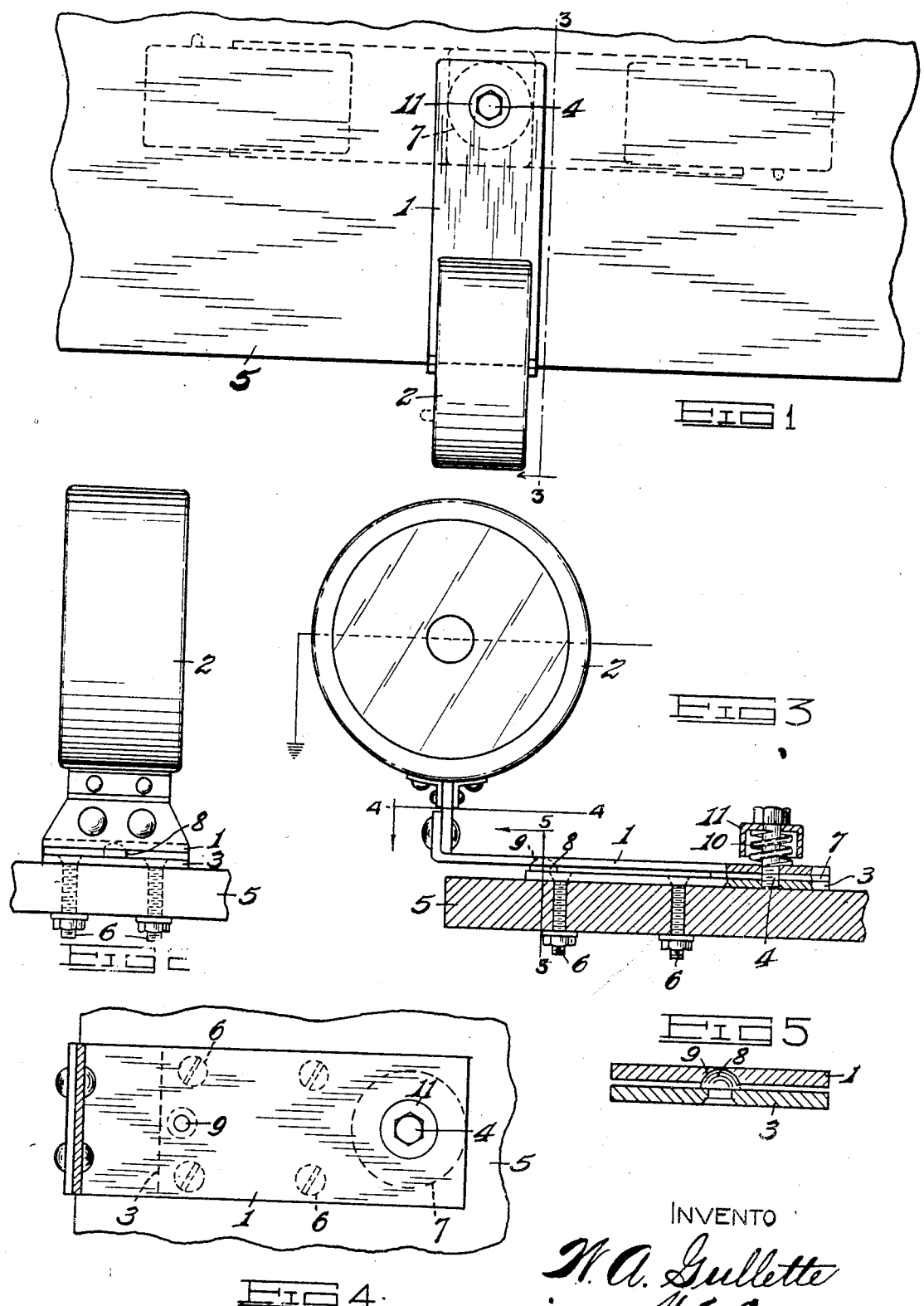

Patented July 3, 1928.

1,675,931

UNITED STATES PATENT OFFICE.

WILLIAM A. GULLETTE, OF WHEELING, WEST VIRGINIA, ASSIGNOR, BY MESNE ASSIGNMENTS, TO MARY ISABEL GULLETTE, OF WHEELING, WEST VIRGINIA.

LAMP SUPPORT FOR AUTOMOBILE RUNNING BOARDS.

Original application filed May 12, 1927, Serial No. 190,809. Divided and this application filed November 14, 1927. Serial No. 232,999.

This invention relates to a mounting for lamps, and it has for its primary object to provide a novel and convenient form of mounting adapted to be carried on the running board of an automobile for the support of a roadway-illuminating lamp.

A further object is to provide a lamp support of the character disclosed in my pending application for Letters Patent, Serial No. 190,809, of which this is a division.

In describing the invention in detail, reference is herein had to the accompanying drawings, in which—

Figure 1 is a top plan view of the invention, applied to a running board;

Figure 2 is a side elevation of the same;

Figure 3 is a sectional elevation on line 3—3, Fig. 1;

Figure 4 is a sectional elevation on line 4—4, Fig. 3; and—

Figure 5 is a section on line 5—5, Fig. 3.

Referring to said drawings, 1 designates the horizontally disposed body portion of a flat plate, herein shown as rectangular in form, which constitutes a bracket for the support of an electric lamp casing 2, said plate having its outer end turned upwardly and having said lamp casing rigidly mounted in upright position thereon. The opposite end of said bracket is loosely mounted on an upright pivot-pin 4 which is fixed in the inner end portion of a transversely disposed base plate 3 carried by the top surface of the running board 5 of an automobile, said plate being secured on said running board by means of bolts 6.

The bracket 1 is normally disposed in overlying seated relation to the plate 3, or to a washer 7 interposed between its inner end portion and said plate. The pivotal mounting described provides for swinging the lamp from its operative position, shown in full lines in Figs. 1, 2 and 3, to either of the two broken line positions shown in Fig. 1, as when the lamp is not in use. Further, said pivotal mounting provides for allowing the lamp to be swung to a non-projecting position relative to the running board by obstructions encountered thereby at the side of the roadway, which obstructions might otherwise break the lamp or its mounting.

To secure the lamp against chance shifting movement from its operative position due to the vibration of the car in travel, the upwardly projecting rounded head of a button 8 borne by the plate adjacent to the outer end of the latter is received within a correspondingly shaped seat formed by an indentation or hole 9 provided in the bracket, as shown in Figs. 2, 3 and 5.

A compression spring 10 encircling the projecting upper end portion of the pivot pin 4 and interposed between the washer 7 and the head of said pin, or a shield-like cap 11 which underlies said head, serves normally to maintain said bracket yieldingly seated relative to the plate 3 and the button 8 of the latter and to permit swinging movement of said bracket to and from operative position in which it is engaged with said button.

As shown, the bracket supports the lamp in a position in which it projects outwardly somewhat with respect to the outer edge of the right hand running board, in which position the lamp may function to project the light rays past the outer edge of the right front mud guard for illuminating the side of the roadway.

What is claimed is—

1. A lamp support for automobile running boards, comprising a base plate adapted to be rigidly mounted transversely upon the running board, an upright pivot pin carried by the inner end of said plate, a plate-like bracket having an end mounted on said pivot pin and adapted to swing upon the latter to and from a position in overlying relation to said base plate, said bracket having its outer end constituting a lamp mounting, and coacting means borne by said plate and said bracket whereby chance movement of the bracket from its plate overlying position is prevented.

2. A lamp support for automobile running boards, comprising a base plate for rigidly mounting in transverse relation to the running board, an upright pivot pin carried by the inner end of said plate, a bracket having an end loosely mounted on said pivot pin and adapted for rotary movement on the latter to and from plate overlying position, means yieldingly holding said bracket depressed relative to said plate, said bracket having its outer end constituting a lamp mounting, and interengageable means borne by said plate and said bracket whereby the latter is normally held against chance movement from its plate overlying position.

3. A lamp support for automobile running boards, comprising a base plate for rigidly mounting in transverse relation to the runing board, an upright pivot pin carried by the inner end of said plate, a bracket having an end loosely mounted on said pivot pin and adapted for rotary movement on the latter to and from overlying position, said bracket having a seat provided in its under side, a button carried by the base plate for engagement with said seat when the bracket occupies plate overlying position, and means yieldingly maintaining said bracket in depressed relation to said plate whereby chance disengagement between said seat and said button is prevented.

4. A lamp support for automobile running boards, comprising a base plate for rigidly mounting in transverse relation to the running board, an upright pivot pin carried by the inner end of said plate, a bracket having an end loosely mounted on said pivot pin and adapted for rotary movement on the latter to and from plate overlying position, said bracket having a seat provided in its under side, a button carried by the base plate for engagement with said seat when the bracket occupies plate overlying position, and a compression spring carried by said pin and exerting downwardly directed pressure upon said bracket for yieldingly maintaining the interengaged relation between said button and said seat.

In testimony whereof, I affix my signature.

WILLIAM A. GULLETTE.